July 7, 1970 B. W. ENGLE 3,519,203

THERMO-HUMIDISTAT

Filed Oct. 3, 1969 2 Sheets-Sheet 1

INVENTOR.
Bruce W. Engle
BY
C. Kenneth Bjork
AGENT

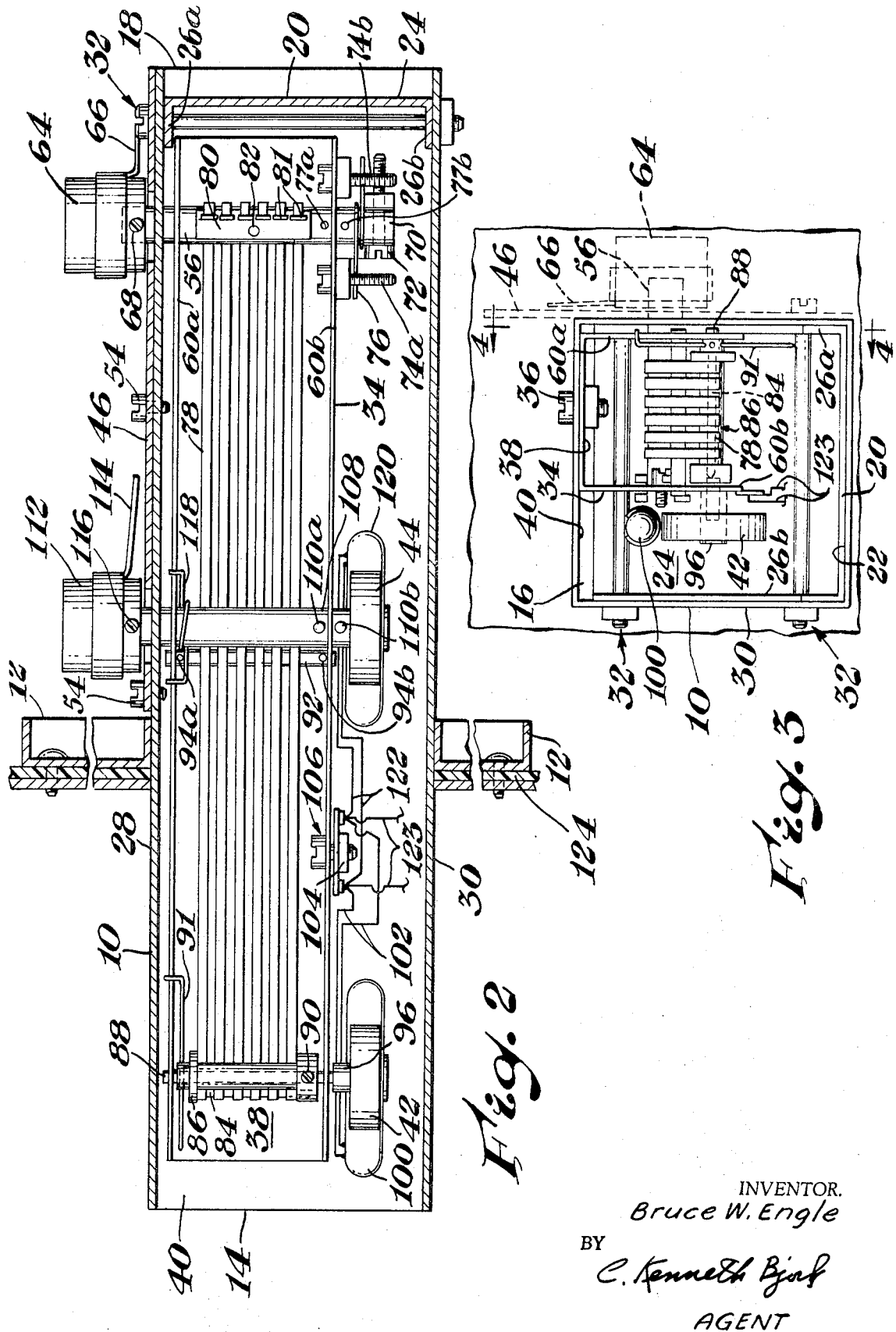

United States Patent Office 3,519,203
Patented July 7, 1970

3,519,203
THERMO-HUMIDISTAT
Bruce W. Engle, 315 Summer St., Box 146,
West Burlington, Iowa 52655
Continuation-in-part of application Ser. No. 723,648,
Apr. 1, 1968, which is a continuation-in-part of
application Ser. No. 626,615, Mar. 28, 1967. This
application Oct. 3, 1969, Ser. No. 863,577
Int. Cl. G05d 22/00
U.S. Cl. 236—44          7 Claims

ABSTRACT OF THE DISCLOSURE

A dryer heater control having two temperature sensitive elements and a humidity sensitive element coupled to operate switches connected to control a drying air heater so that regardless of changes in atmospheric temperature and humidity a product will be dried to a desired moisture content or at a predetermined drying temperature.

This control apparatus is particularly suitable for controlling heaters employed in drying operations wherein a predetermined final moisture content is desired, or alternatively, wherein a preselected drying temperature is preferred or required, in a product being dried, e.g. a grain.

Backgound of the invention

This application is a continuation-in-part of patent application Ser. No. 723,648, filed Apr. 1, 1968, now Pat. No. 3,484,947, issued Dec. 23, 1969 which in turn was a continuation-in-part of patent application Ser. No. 626,-615, filed Mar. 28, 1967, now abandoned.

The control of forced hot air heaters and other heating means used to dry a manufactured or natural product or material to a predetermined moisture content in the presence of varying atmospheric conditions of temperature and humidity heretofore has been achieved only with difficulty. To illustrate, crop dryer manufacturers conventionally supply separate humidistats and thermostat assemblies for controlling the heaters employed in such dryers but these must be used singly or in tandem and do not provide close and precise control of the required or desired moisture content in the product being dried. Since the heat required to dry grain, for example, to a given final moisture content varies with a temperature and humidity of the air, the control instruments must analyze such changes in the atmosphere and correspondingly control the operation of the heater, to assure that the optimum temperature is maintained during the drying operation.

Crop drying, especially of shelled corn, is being practiced on a rapidly increasing scale not only in this country but in other grain producing countries of the world. This practice is strongly recommended by agriculture extension services of various states. Also, grain bin manufacturers extol the money saving values of early harvest and crop drying. However, to assure the optimum in yield of the dried product, one must guard against excess loss of weight from overdrying which can more than offset the added profit realized from early harvest. Overdrying of grain crops through lack of proper temperature and humidity controls for crop dryers is a common problem to the users of such dryers.

It is a principal object of the present invention to provide an apparatus suitable for controlling the heat output of a heater on a forced air dryer so as to obtain a predetermined final moisture content in the product being dried even under varying atmospheric temperature and humidity conditions.

It is also an object of the present invention to provide a novel temperature and/or humidity activated heater control unit which is compact and readily installed in a crop or other forced air dryer.

These and other objects and advantages of the present invention readily will become apparent from the detailed description presented hereinafter when read in conjunction with the drawings.

Brief description of the drawings

FIG. 2 is a bottom view of the heater control apparatus of FIG. 1 with bottom removed and looking upwards into the apparatus.

FIG. 3 is an end view of the heater control apparatus of FIG. 1 as seen from within the dryer.

Summary

Figure 4:
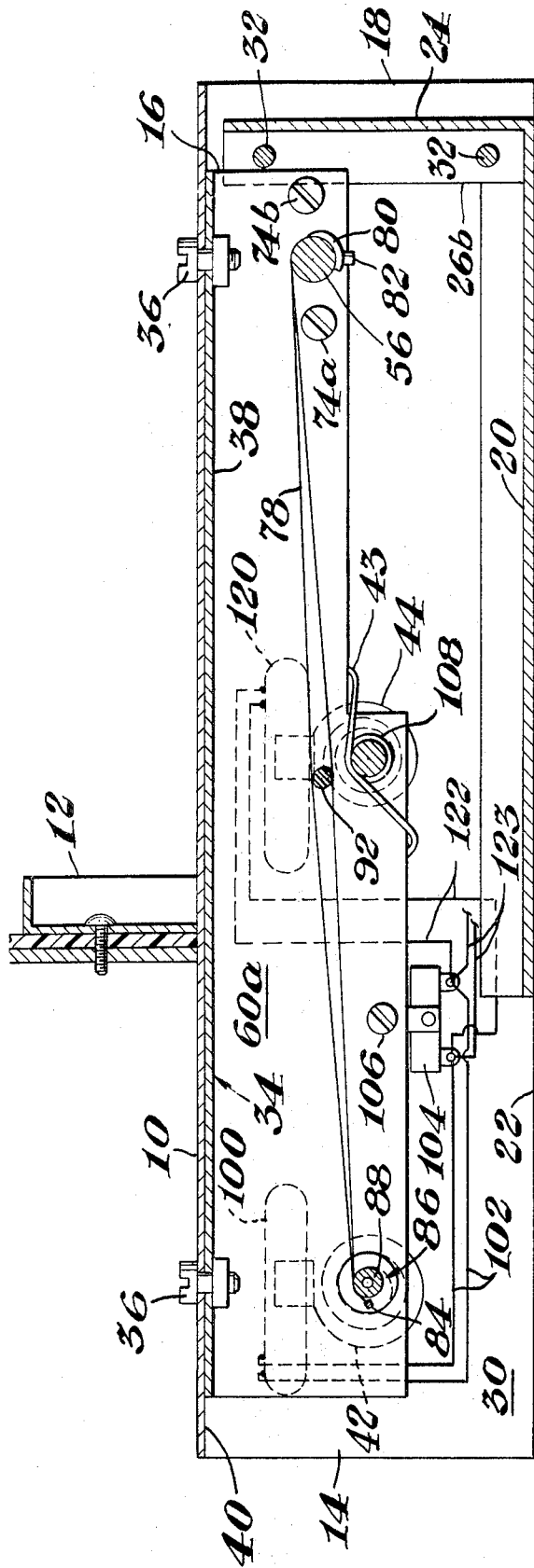
FIG. 4 is a sectional view of the heater control apparatus taken along line 4—4 of FIG. 3.

In general the heater control apparatus of the present invention comprises a supporting framework and instrument box assembly supporting one humidistat and two thermostats, each thermostat being connected to a separate displacement type swicth such as a mercury switch, for example; both switches are connected to the control circuit of a heater. Both thermostats and the humidistat during operation are continually exposed to the air in the plenum, i.e. drying chamber, of the dryer. The humidistat and the first thermostat are interconnected in such a manner that change in the humidity of the air in the chamber causes the humidistat to activate or deactivate this thermostat, thereby through the switch making or breaking the electric circuit to the heater. Also, any change in the temperature of the air in the drying chamber will, by expansion or contraction of the first thermostat cause this same mercury switch to make or break the electric circuit to the heater.

The humidistat and first thermostat are connected to a scaled moisture indexing indicator which can be set to provide a predetermined moisture content in a product or material being treated in the dryer. The second thermostat is connected to a temperature indexing indicator which can be set to provide a predetermined temperature within the plenum chamber during the drying operation.

The second thermostat operates independently with any change in the temperature of the drying chamber air to activate, or deactivate, the switch connected thereto, but since its electrical circuit is connected in parallel with the switch on the first thermostat it can be set low to act as a low limit temperature switch when drying with an equilibrium temperature. Alternatively, it can be set to maintain any higher temperature desired when the moisture indicator is set at the highest reading on the moisture scale. Positioning the moisture indicator at its highest setting opens the switch circuit of the first thermostat and gives the second thermostat complete control.

The instrument initially is calibrated by correlating the relationship of the movements of the first thermostat and the humidistat in such a manner that, regardless of the rise and fall of the temperature and humidity of the ambient air, it will regulate the heater of the crop dryer to maintain the proper equilibrium temperature in the plenum chamber of the drying bin to secure whatever moisture content the operator has selected. Further, the graduations on the moisture scale are spaced at predetermined intervals such that at all settings they reflect the equilibrium temperature at a given moisture content setting. For a given product this can be ascertained by referring to established tables listing these relationships as given in various state and federal government agriculture department publications. See, for example, Iowa State University Cooperative Extension Service Bulletin No. 313 where on page 3, Table 2, the effect of drying air temperature and relative humidity on the final moisture content is tabulated.

In an actual drying operation using the present control apparatus with a grain dryer, the system operates according to the following principles as set forth on pages 3 and 4 of the Iowa State University Cooperative Extension Service Bulletin No. 313. These principles are:

(1) Raising the temperature of drying air 20 degrees F. decreases the relative humidity of the air approximately one-half.

(2) The temperature and relative humidity of the drying air determine the final moisture content of the product being dried, e.g. a grain such as shelled corn.

(3) There is a direct interrelationship of drying air temperature and humidity, e.g. atmospheric conditions, and moisture content of grain being dried. To illustrate, the graph of FIG. 2, page 4 of the Bulletin shows that air at 30 degrees F. and 80 percent relative humidity must be heated 13 degrees to provide a grain product having a final desired moisture content of 12–13 percent. Air originally at 70 degrees F. and 80 percent relative humidity, on the other hand, must be heated only 7 degrees to get the same results. Therefore, it is apparent that as the temperature of the ambient air rises, a smaller temperature differential is required at a given humidity to maintain an equilibrium drying temperature.

To illustrate the operation of the claimed heater control apparatus in a typical grain drying operation, a blower of a grain bin crop dryer runs continuously forcing ambient air through a heater and air duct into the plenum chamber of the drying bin, then upward through the perforated floor and the grain in the bin, finally being vented through port holes in the roof.

A thermo-humidistat control as shown in the figures of the drawing, for example, is mounted on the outside wall of the plenum chamber so that the temperature and humidity sensing elements in the instrument box project into the plenum chamber, and since the vent on the outside end of the instrument box permits a constant flow of plenum chamber air through the box to the atmosphere, the sensing elements inside the box are continuously exposed to this plenum chamber air.

The displacement switches in the instrument box are connected in parallel with the electric circuit of the solenoid fuel valve of the heater. When either switch is closed it operates the solenoid valve thereby permitting the fuel, e.g. liquid petroleum gas, fuel oil, etc., to flow into the heater. Both switches must be open to close the solenoid valve.

When the sensing elements in the instrument box (i.e. the first thermostat and the humidistat) determine that heat must be added to the ambient air, to bring the grain to the selected moisture content, the displacement switch is closed thereby energizing the electric circuit to the solenoid fuel valve, permitting fuel to flow to the heater.

Any change in the humidity of the plenum chamber air will activate the humidistat which in turn activates the first thermostat thereby activating or deactivating the displacement switch and making or breaking the electric circuit to the solenoid fuel supply valve of the heater. Also, any change in the temperature of the plenum chamber air will activate the first thermostat which will independently, or in unison with the humidistat, cause the displacement switch attached thereto to make or break the electric circuit to the solenoid fuel supply valve of the heater.

It can readily be seen that the present control apparatus operates entirely upon the humidity and temperature conditions of the drying air, or other gas, within the plenum chamber itself, and thus is independent of the exterior atmosphere. This feature is of particular advantage during a rain or snow storm when the spray from the rain drops or snow flakes being forced into the drying chamber by the blower raises the humidity of the plenum chamber air considerably above the ambient air.

The ability of this instrument to regulate the heater of a crop dryer to maintain an equilibrium drying temperature at any moisture content selected by the operator prevents the costly overdrying of grain, especially in those lower sections of the drying bin, which, previous to the advent of this instrument has been most difficult to do. For such an operation the moisture indicator is set at the desired moisture content and the temperature indicator is set at the lowest temperature desired, thereby acting as a low limit switch. This low limit temperature capability is of particular advantage in cold dry weather when the equilibrium drying temperature may fall below freezing as grain dries very slowly at equilibrium temperatures below freezing. Also, it prevents the formation of ice and the subsequent restriction of the drying air flow when grain of high moisture content is placed in the drying bin when the equilibrium drying temperature at the desired moisture content is below freezing.

Alternatively, for rapid drying or batch drying, the moisture indicator is set at the highest point on the moisture scale and the temperature indicator to the desired drying temperature. This provides complete control of the heater at the selected temperature by the second thermostat.

Description of preferred embodiments

Figure 1:
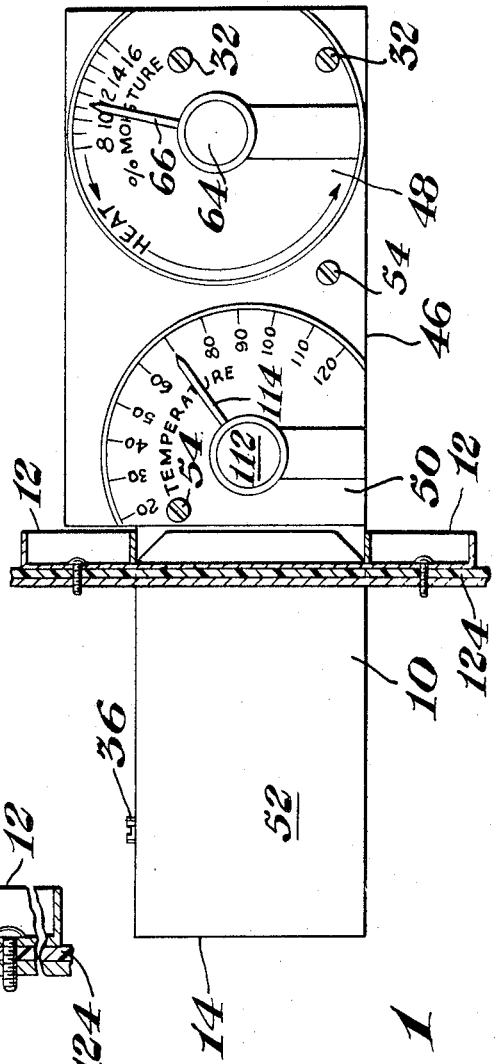
FIG. 1 is a side elevation of one embodiment of the heater control apparatus of the present invention, hereinafter at times referred to as a "thermo-humidistat," showing the instrument box of the apparatus wherein the apparatus is fastened to the outside wall of the plenum chamber of a dryer.

One preferred embodiment of the heater control apparauts of the present invention is illustrated by FIGS. 1–4. In this depicted embodiment, the apparatus comprises an elongated, usually square or rectangular box-like outer frame 10 having affixed to its exterior a mounting flange 12. Frame 10 is open-ended at one end 14 and contains a vent 16 at its other end 18. The vent 16 in the depicted embodiment is provided by an L-shaped member 20 attached to both the front wall 28 and back wall 30 of frame 10 by means of bolts 32. One leg 24 of this L-shaped member 20 projects upwardly within frame 10 near end 18. The height of this leg 24 is less than that of the interior of frame 10 thereby providing the vent 16. The size of vent 16 is not critical although to assure only minimal losses of drying air from the plenum chamber, ordinarily this vent measures about ⁹⁄₁₆ inch in height and is the width of the frame 10. Alternatively, frame 10 can be fitted with a closed end 18 having a screened or louvered vent therein. Other means of providing vent 16 in frame 10 as understood by one skilled in the art can be employed. Leg 24 contains on each side a right angle flange 26a–26b. The flange 26a mates with interior of front wall 28 of frame 10 and flange 26b mates with the interior back wall 30 of frame 10. Bolt and nut assemblies 32 extending from the front to back of frame 10 and passing through flanges 26a–26b secure member 20 to frame 10.

A substantially inverted U-shaped frame 34 is positioned within frame 10, extending along the length thereof and rigidly fastened by securing means 36 such as, for example, machine screws through its base 38 to the interior top walls 40 of frame 10. Frame 34 extends over the greater portion of the length of frame 10 and ordinarily about half as wide as the depth of frame 10 from front to back. This latter dimension is not critical as it is essential only that the frame 34 be of a width to provide for ready position of the first and second thermostats 42 and 44 exterior thereof but within frame 10. A dial plate 46 containing moisture indicating dial 48 and temperature indicating dial 50 is fastened to the exterior of front wall 28 of frame 10 by securing means, for example, bolt and nut assemblies 32 and screws 54.

A selector shaft 56 is supported by, and turns in bearings positioned in the legs 60a–60b of U-shaped member 34 near the end 18 of frame 10. Shaft 56 passes freely through the front wall 28 of frame 10 extending beyond dial plate 46. The shaft 56 is placed so as to be centered with respect to moisture indicating dial 48. A moisture selector, for example, a knob 64 having pointer 66 is secured to selector shaft 56 by a set screw 68 near the end of the shaft 56 exterior to the apparatus.

The other end 70 of shaft 56 extends beyond the leg 60b of frame 34. An elongated member 72, e.g., a bolt and nut striker assembly, is passed through the shaft 56 near its end 70. This member 72 is of a length and extends outwardly on one side of shaft 56 such that it strikes two projections 74a and 74b extending from leg 60b of frame 34 of both sides of shaft 56. Conveniently, projections 74a–74b are nut and bolt stop assemblies positioned in leg 60b having the bolt end extending rearward of leg 60b so as to limit rotational movement of shaft 56 to approximately one-half revolution through contact with striker assembly 72. A spring 76 looped around shaft 56 and having its ends contacting stop assemblies 74a–74b provides for retention of the shaft 56 in a predetermined position after rotation. Securing means 77a–77b, e.g. cotter pins or the like, passed through shaft 56 adjacent to and on either side of leg 60b prevents lateral end movement of this shaft 56.

The humidistat comprises as its humidity detecting element multiple loops of a single strand of humidity sensitive tape 78 threaded through slotted bracket 80 and over anchor pin 84 which is located in arbor 86 at the opposite end of U-frame 34. Both ends of this multiple looped tape 78 are secured to slots 81 in bracket 80. Bracket 80 is hooked over and held by pin 82 positioned in selector shaft 56. Anchor pin 84 has its ends anchored in a collared tubular arbor 86. Arbor 86 passes over a shaft 88 positioned near the end of U-shaped frame 34 opposite shaft 56. The ends of shaft 88 extend through legs 60a–60b of frame 34, being supported by bearings therein which provides for free fit and rotation of said shaft 88. Arbor 86 is firmly anchored to shaft 88 by securing means such as, for example, a set screw 90.

A spiral coil spring 91 is attached at its center coil to the end of arbor 86 next to leg 60a of U-frame 34; the outer end of the coil spring 91 is secured to leg 60a of frame 34. This spring 91 keeps a constant tension on humidity tape 78 and causes arbor 86 to revolve when the tape expands with an increase in humidity or contracts with a decrease in humidity.

Each loop of humidity tape 78 passes at about its midpoint on opposite sides of a separator 92, i.e. a pin or shaft, which passes through legs 60a–60b of frame 34. Lateral end movement of pin 92 is prevented by securing means, e.g. cotter pins, 94a–94b passing therethrough and positioned respectively adjacent the inner walls of legs 60a–60b. The use of pin 92 is not critical; it is advantageous, however, in that it gives each strand of tape 78 better exposure to plenum chamber air.

The number of strands or loops of humidity tape 78 to be employed in a given apparatus can be varied. A single strand or loop is operable, but for high precision and increased sensitivity 4 or more loops are desirable. Conveniently, as shown in a typical apparatus particularly suitable for use in controls or grain dryer heaters, 5 or 6 loops are employed.

Exterior of leg 60b of frame 34 a hub 96 is firmly attached to shaft 88. A coil thermostat 42 is affixed by its inner end to hub 96. Attached to the outer perimeter of thermostat 42 is a mercury or other type displacement switch 100 having leads 102 connecting switch 100 to a terminal 104 fastened to frame 34 as by a bolt and nut assembly 106.

Intermediate of shafts 56 and 88 is a selector shaft 108 which passes through and is supported by bearings in legs 60a–60b of frame 34 and extends beyond the exterior of the front wall 28 of frame 10 and dial plate 46. This shaft 108 is positioned to be centered with respect to temperature indicating dial 50. Securing means 110a–110b, e.g. cotter pins or the like, passed through shaft 108 adjacent to and on either side of leg 60b prevents lateral movement of shaft 108. A temperature indicator, such as a control knob 112 having a pointer 114 is secured to shaft 108 by a set screw 116 on the end of the shaft 108 exterior to the apparatus. A coil spring 118 is passed over shaft 108 inside of leg 60a and has its ends secured to this leg 60a thereby providing friction and tension to hold the shaft 108 in a predetermined position and assuring that it does not move on its own accord.

The other end of shaft 108 extends beyond the leg 60b of frame 34. The second coil thermostat 44 is affixed by its inner end to this end of shaft 108. Attached to the outer end of thermostat 44 is a mercury or other type displacement switch 120 having leads 122 connecting switch 120 in parallel with the leads 102 from switch 100 at terminal 104. Leads 123 are connected to the heater circuit (not shown).

Installation of the apparatus is made by bolting the instrument box by means of flange 12 to the exterior wall of a plenum chamber with the open end 14 of the instrument extending into the chamber. Conveniently, a gasket 124, e.g. of sponge rubber, cork or the like, is employed between the flange and the chamber wall to assure no leakage.

To set the thermo-humidistat to maintain an equilibrium drying temperature at any moisture content selected or desired by the operator, the moisture selector knob 64 is moved until the pointer 66 is over the desired moisture content mark on the scale 48. This knob 64 rotates the shaft 56 in its bearings and winds or unwinds the humidity tape 78 around shaft 56. This movement also causes arbor 86 to revolve. When arbor 86 revolves, the first thermostat 42 rotates thereby upsetting the displacement switch 100 and making or breaking the electric circuit to the solenoid fuel supply valve of the heater. The temperature control knob 112 is moved such that indicator 114 is set at the lowest temperature desired and thus acts as a low limit switch. The initial temperature increase, if any, is determined by the moisture setting of the instrument and the temperature and humidity of the plenum chamber air. Thereafter any changes in the temperature or humidity of the plenum chamber air will be continuously analyzed by the sensing elements in the instrument and heat added or cut off by energizing or de-energizing the electric circuit to the solenoid fuel supply valve of the heater. The thermostat 42 monitors the plenum temperature in accordance with the rise and fall of the temperature therein while the humidistat responds to the changes in the humidity of the plenum air and converts these into temperature changes thereby modifying the action of the thermostat 42.

To maintain a predetermined drying temperature, the temperature indicator 114 is set at the desired temperature on dial 50 and the moisture indicator 66 is set at the highest moisture graduation on dial 48. This permits the second thermostat 44 to have complete control so that any changes in the plenum chamber air temperature will, by expansion or contraction of thermostat 44, upset switch 120 thereby making or breaking the electric circuit to the solenoid fuel supply valve of the heater and consequently increasing or decreasing the plenum chamber air temperature within a narrow range of the temperature selected by the operator.

The humidity sensing element for use in any embodiment of the control apparatus of the present invention can be selected from any of a variety of materials which undergo set dimensional changes with variations in humidity. Human hair, usually in plaited or braided form, can be used. This natural material, however, suffers from the disadvantage that it has a relatively small dimensional change with humidity changes and also cannot be used at higher temperatures.

One particularly suitable humidity sensing element is an oriented nylon tape sold under the trade name of Ruvea. This material, when employed in a thickness of about 0.001 inch, for example, has been found to exhibit relatively large regular dimensional changes with changes, i.e. risings and fallings, in the relative humidity of the air.

Unexpectedly, I now have found that if such a Ruvea nylon tape or similarly oriented nylon tape is treated by one of the following treatments it is possible to further markedly increase the already excellent sensitivity and dimensional changes with a given change in humidity inherently present in such a tape.

The tape can be immersed in boiling water for a period of about one minute, ordinarily from about one to about 10 minutes. The tape can then be removed from the aqueous treating bath. Alternatively, the tape can be allowed to remain in the bath for an additional period, usually of from about 10 to about 30 minutes during which time the water temperature is cooled to about 120° F. In still another modification the tape can be held in fixed position during either the treatment in boiling water or the subsequent warm water holding stage, if employed, to assure that the tape does not shrink or otherwise deform during this aqueous sensitivity promoting process.

It is to be understood that if a tape treated as set forth herein is employed in a thermo-humidistat unit, as fabricated, the unit must be calibrated to account for the increase in tape sensitivity such that the actual relative humidity being measured is shown by the humidity indicator marker of the unit.

An electric relay can be incorporated into the system so that any number of adjacent heaters can be operated by a single control apparatus. Thus by placing thermometers in the plenum chambers of the adjacent bins, their heater outputs can be regulated to correspond with the temperature in the master bin containing the control apparatus.

I claim:

1. A heater control apparatus for maintaining and controlling the heat output of a heater under varying conditions of temperature and humidity which comprises in combination:
    (a) a supporting framework and instrument box assembly,
    (b) a humidistat and a first and second thermostat supported by said assembly, the first of said thermostats being interconnected with said humidistat in such a a manner that a change of humidity activates or deactivates said thermostat, the second thermostat operating independently of said humidistat and said first thermostat,
    (c) separate displacement type switches connected to each of said first and second thermostats, said switches activating or deactivating the electric circuit of said heater,
    (d) a scaled moisture indexing indicator exterior of said instrument box, said indicator connected to said humidistat by means such that said first thermostat and humidistat rotate with changes in position of said moisture indexing indicator,
    (e) a scaled temperature indexing indicator exterior of said instrument box, said temperature indicator connected to said second thermostat by means such that said second thermostat rotates with changes in position of said temperature indexing indicator, and
    (f) said humidistat and first thermostat being correlated with said moisture indexing indicator and said second thermostat being correlated with said temperature indexing indicator so as to provide a controlled heat output from a heater under varying conditions of temperature and humidity.

2. The heater control apparatus as defined in claim 1 wherein said displacement switches are mercury switches, and said first and second thermostats are coil thermostats, one each of said switches being mounted on the outer perimeter of each of said thermostats.

3. The heater control apparatus as defined in claim 1 wherein the humidity detecting member is a plurality of loops of a humidity sensitive tape.

4. The apparatus as defined in claim 3 wherein the humidity detecting member is an oriented nylon humidity sensitive tape, said tape undergoing dimensional changes with changes in relative humidity.

5. The apparatus as defined in claim 4 and having a boiling water treated oriented nylon tape which exhibits increased sensitivity and amount of dimensional changes of said tape with changes in relative humidity.

6. The heater control apparatus as defined in claim 2 wherein said first thermostat and said humidistat are connected to a rotatable shaft having said moisture indexing indicator affixed thereto, said shaft being positioned in said supporting framework.

7. The heater control apparatus as defined in claim 2 wherein said second thermostat is connected to a rotatable shaft having said temperature indexing indicator affixed thereto, said shaft being positioned in said supporting framework.

References Cited

UNITED STATES PATENTS 2,059,846  11/1936  Bulger _____ 236—44
2,106,083   1/1938  Chappell et al. _____ 236—44

WILLIAM E. WAYNER, Primary Examiner

U.S. Cl. X.R.

34—48, 50; 337—300